H. MERCIER.
PNEUMATIC MEANS FOR MOUNTING CARRIAGES ON WHEELS.
APPLICATION FILED JUNE 1, 1914.
1,179,447.  Patented Apr. 18, 1916.
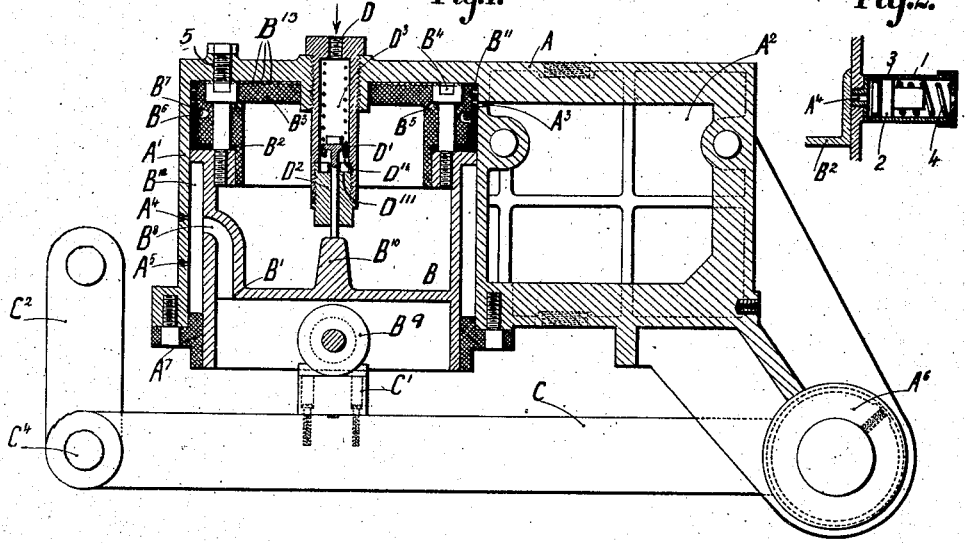
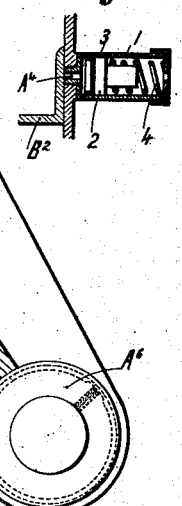
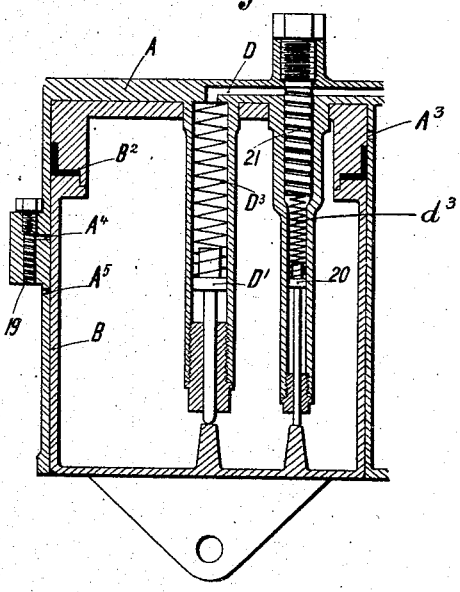
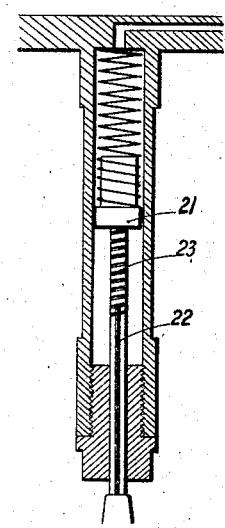
INVENTOR
Henri Mercier

UNITED STATES PATENT OFFICE.

HENRI MERCIER, OF PARIS, FRANCE.

PNEUMATIC MEANS FOR MOUNTING CARRIAGES ON WHEELS.

1,179,447. Specification of Letters Patent. Patented Apr. 18, 1916.

Application filed June 1, 1914. Serial No. 842,208.

*To all whom it may concern:*

Be it known that I, HENRI MERCIER, citizen of the French Republic, residing at Paris, Department of the Seine, in France, have invented certain new and useful Improvements in Pneumatic Means for Mounting Carriages on Wheels; and I do hereby declare the following to be a full, clear, and exact description of the invention, such as will enable others skilled in the art to which it appertains to make and use the same.

This invention relates to pneumatic suspension devices for vehicles of the kind comprising a piston moving within a cylinder having a leakage aperture and fed with compressed air through an automatically controlled valve, an auxiliary air-chamber being provided communicating with the cylinder through a small hole which is opened and closed by the piston.

These devices were defective in that they consumed a very large quantity of compressed air, and the present invention seeks to remedy this and other disadvantages of the prior devices.

According to the present invention, the admission of air is controlled by a spring-closed valve which is opened by the piston only after the latter has closed the passage leading from the cylinder to the auxiliary air-chamber. Owing to this arrangement, air is not admitted directly from the air-admission valve to the auxiliary chamber.

Another feature of the invention consists in making the piston hollow and providing a small hole leading from the cylinder to the interior of the piston, so that the hollow piston acts as a second auxiliary air-chamber.

In order to prevent loss of air through the leak-hole when the piston moves downwardly only for a moment, as when the wheel passes a hole in the road, a retarding apparatus is provided, comprising a small cylinder having a spring-pressed piston which must be pushed a certain distance before air can leak into the atmosphere. Thus unless the leak-hole is uncovered for an appreciable time no loss of air can take place.

In the accompanying drawings given by way of example:—Figure 1 shows in section a construction of the suspension device according to this invention; Fig. 2 shows a section of the small cylinder retarding the escape of air; Fig. 3 shows in section a suspension in which, in addition to the usual air inlet-valve, a supplementary valve is used; and Fig. 4 shows a modified construction in which the two valves shown in Fig. 1 are combined in a single valve.

A is the cast iron body which is secured to the chassis of the vehicle (not shown).

The body comprises two main parts, the cylinder $A^1$ intended to receive the piston, and the auxiliary air-chamber $A^2$ which communicates with the cylinder through a small port $A^3$ arranged, in the construction illustrated, at 20 mm. from the cover of the cylinder. In the wall of the cylinder are two leak-holes or discharge orifices $A^4$ and $A^5$.

$A^6$ is a socket cast with the body and intended to receive the pivot pin of a lever for which it forms a support.

$A^7$ is an annular brass collar closing the mouth of the cylinder, said collar being secured to the cylinder by studs and nuts, and forming a guide for the piston. Said collar also limits the stroke of the piston.

B is the hollow piston traveling in the cylinder A. It comprises three main parts, the body $B^1$, the leathers $B^2$ and the piston cover $B^3$, the latter securing the leathers to the piston by means of screws.

Owing to the requirements of lubrication, and also in order to insure free circulation of the compressed air driving the piston, the upper face of the cover $B^3$ is grooved in an annular manner so as to prevent its adhesion to the cover of the cylinder. These grooves are shown at $B^{13}$ in Fig. 1. The said face is also provided with a circular groove $B^4$ intended to collect the oil introduced or projected against the cover of the cylinder, and a small hole $B^{11}$ leads from this groove to a point opposite the port $A^3$, for a purpose hereinafter described. The oil escapes through the holes $B^5$ and falls back again into the interior of the piston from which it is raised again during the violent oscillations of the piston and under the action of "flushes" of air. This insures continuous circulation of the oil supply collected at the bottom of the piston. The wall of the cylinder, the leathers and the guide collar thus receive automatically the quantity of oil required for satisfactory operation, and very little oil is carried away into the dash-pot chamber. The leathers $B^2$ are pressed against the wall of the cylinder by a compressed helical spring $B^6$ previously placed on a split ring $B^7$ (Fig. 1.) This arrangement is necessary for insuring a proper joint of the leathers.

Between the piston and the cylinder is arranged an annular cylindrical space $B^{12}$ freely communicating with the atmosphere through an air-hole $B^8$ (Fig. 1). When the piston is lowered, this air hole is at a certain moment covered by the collar $A^7$. Thereafter the said annular space is closed, the air contained in the same is compressed and forms an air cushion for avoiding shock of the piston against the ring, at the bottom of its stroke. The same applies when the cylinder rises to the top of its stroke, the air forced back by the rising movement of the piston, can no longer freely escape into the dash-pot auxiliary air-chamber as soon as the upper face of the piston cover $B^3$ covers the port $A^3$, for at that moment the compressed air at the upper portion of the cylinder is in communication with the port $A^3$ only through the small hole $B^{11}$ and with the interior of the piston only through the holes $B^5$. These holes, the cross-sections of which are very small, cannot discharge sufficiently quickly the air inclosed between the piston and the cover of the cylinders, and the said air forms a cushion and prevents any shock of the piston against the cover of the cylinder, at the top of its stroke. The piston is connected to the wheel of the vehicle by means of a roller $B^9$ rotating on a pin secured to the walls of the piston, and a lever C which rests on the socket $A^6$ and can move in the vertical plane by rotating about the pin of the said socket. The said lever is provided with a thrust block $C^1$ having a hardened surface, and adapted to take the thrust of the roller $B^9$ of the piston. The movement of the piston is transmitted amplified by the lever to the hanger $C^2$ which acts on the end of the ordinary laminated or leaf spring of the car.

In addition to the air-hole $A^4$ which is uncovered by the leathers when the piston is lowered, there is a second air-hole $A^5$ which acts as an auxiliary safety outlet.

Compressed air is admitted through the air-inlet valve D. When the piston is at the top of its stroke, the valve $D^1$ is lifted (in the type described in Fig. 1, the said travel is 20 mm.). Compressed air passes around the loosely fitting valve $D^1$, then along the rod of the valve, which is grooved to that end, spreads in the cavity of the piston, passes through the holes $B^5$, and exercises its pressure on the upper face of the piston. Under the action of the said pressure, the piston is lowered, the valve, pushed by the spring $D^3$, slides in the guide plug $D^2$ in accordance with the movement of the piston. The valve $D^1$ closes when the face $D^{11}$ comes into contact with the seating $D^{111}$. When the piston has descended to an extent corresponding to the closing of the valve, that is to say 20 mm. in the apparatus illustrated, the port $A^3$ is uncovered at the same moment; and all the parts of the apparatus are then in open communication with each other and also filled with air at the pressure necessary for balancing the weight of the car at a standstill. In these conditions, the device is ready to work as soon as the car is started. In fact, as soon as there are any vibrations, the rod of the valve is struck by the projection $B^{10}$ of the piston. This results in a series of new admissions of compressed air, which takes place instantaneously at each blow of the projection $B^{10}$ against the rod of the valve. These additional admissions of compressed fluid gradually result in moving the piston away from the cover of the cylinder to a greater extent than it was in the equilibrium position hereinbefore described for the car at a standstill. The blows then become more and more rare, and cease completely for a given state of the road. The device thus finds a new position of equilibrium. This position of equilibrium does not, however, correspond to the position of the leak-hole $A^4$. It depends exclusively on the state of the road. The worse the road, the more the suspension is inflated, and the better it adapts itself to the requirements of the moment. The leak-hole $A^4$ moreover fixes a limit to the said inflation, and it enables the device, as soon as the road improves, to return to a less inflated condition, adequate for the reduced movements of the axle and of the piston.

The leak-hole $A^4$ becomes also operative if, for any reason other than that of the state of the road, the quantity of air admitted becomes too great. It was hitherto considered obvious that the leak-hole $A^4$ had to be made of very small cross-section to afford passage to a small quantity of fluid, as it was frequently uncovered when the wheels passed over holes in the road, and at that moment it was advisable not to allow too large a quantity of fluid to escape. Experience has proved, however, that holes, even small ones, opening into the atmosphere discharge frequently an excessive quantity of fluid while the same small holes present the disadvantage of becoming frequently choked. Fig. 2 shows the device used for obviating this double drawback. To that end, the leak-hole $A^4$, provided with a cross-section amply sufficient to avoid choking, communicates with a small cylinder 1 provided with a piston 2 and with a secondary air hole or leakage hole 3 of large cross-section. A spring 4 always returns the piston to the bottom of its stroke. The result of this arrangement is that the uncovering for a very short time of the leak-hole $A^4$, does not result in a loss of air, as the piston of the small cylinder can be move sufficiently quickly to uncover the leakage hole in time.

Oil is introduced through the hole 5 into the groove B⁴ and escapes through the conduits B⁵. It collects at rest on the bottom of the piston. During the running it is worked into an emulsion by the effect of vibrations and is projected in the shape of a froth and drawn in by the charges of air resulting from sudden descents of the piston, to the upper portion of the cylinder whence it reaches the friction surfaces in order to collect afterward again in the groove B⁴ and fall back to the bottom of the piston. Continuous automatic lubrication is thus produced without the intervention of any other mechanical part.

In order to diminish the frequency of the fluctuations, valves may be provided as shown in Figs. 3 and 4 which prevent lowering of pressure in the cylinder due to the leakages of the device by introducing continually a very small quantity of fluid. In addition to the usual air inlet valve $D^1$ supplied from the compressed-air duct D and controlled by a spring $D^2$ and arranged in the interior of the piston B moving in the cylinder A, there is arranged an additional valve 20 throttled by the helical grooves 21, closed by a spring $d^3$ and operated by a boss $b^{10}$ in the piston B. When the piston is at the top of its stroke, the valve 20 is pushed back by the boss $b^{10}$ to a height corresponding to the distance separating the end of the stamped out leathers $B^2$ from the leak-hole $A^4$. In these conditions, the valve 20 supplies air continuously until the piston B uncovers the leak-hole $A^4$. The suspensions thus assume, in the position of rest, an equal degree of inflation, and the horizontal position of the chassis is gradually reëstablished. In order to avoid an excessively rapid outlet of air through the leak-hole $A^4$, the latter is provided with a screw having a retarding groove 19. The auxiliary leak-hole $A^5$ always discharges freely into the atmosphere.

Fig. 4 shows an arrangement in which the two valves 20 and $D^1$ of Fig. 1 are combined. The spindle of this combined valve 21 is provided with a rectilinear groove 22 of a cross-section and length calculated so as to admit air quickly into the chamber of the piston, as long as the latter has not uncovered the passage $A^3$ between the cylinder and the auxiliary air-chamber. The admission of air is subsequently insured by a helical groove 23 rendering the discharge slower as the valve closes, and stopping it altogether at the moment when the leathers come flush with the leak-hole $A^4$ of Fig. 1.

What I claim is:—

1. In pneumatic suspension mechanism for vehicles, the combination of a cylinder, a piston operating therein, first and second auxiliary chambers, valve mechanism operated by relative movements between the cylinder and the piston for admitting compressed fluid to the second auxiliary chamber, said second auxiliary chamber being in permanent communication with the space between the head of the piston and the end of the cylinder, and a passage leading from the cylinder to the first auxiliary chamber and so positioned as to place said space in communication with the first auxiliary chamber after predetermined movement of the piston, said valve mechanism being arranged to close when such communication is established.

2. In pneumatic suspension mechanism for vehicles, the combination of a cylinder, a hollow piston operating therein, valve mechanism operated by movements of the piston for admitting compressed fluid to the interior of the piston, a restricted passage placing the interior of the piston in communication with the space above the piston, an auxiliary chamber and a passage leading from the cylinder to said auxiliary chamber and so disposed as to establish communication between said space above the piston and the auxiliary chamber after a predetermined movement of the piston, said valve mechanism being arranged to close when such communication is established.

3. In pneumatic suspension mechanism for vehicles, the combination of a cylinder, a piston operating therein, means comprising a valve actuated by relative movements between the piston and the cylinder to admit compressed fluid to the space above the piston, a discharge orifice in the wall of the cylinder, a relatively small cylinder into which said orifice discharges, and a spring-pressed piston yieldingly resisting the discharge of fluid from said relatively small cylinder.

4. In pneumatic suspension mechanism for vehicles, the combination of a cylinder, a piston operating therein, means comprising a valve to admit compressed fluid to the space above the piston, an auxiliary chamber, a passage leading from the cylinder to said auxiliary chamber and so disposed as to establish communication between the space above the piston and said auxiliary chamber after predetermined movement of the piston, a discharge orifice located in the cylinder wall at a point below said passage, and auxiliary fluid-supplying means designed to continue the admission of compressed fluid to the space above the piston until the piston uncovers said discharge orifice.

5. In pneumatic suspension mechanism for vehicles, the combination of a cylinder, a piston operating therein, means comprising a valve actuated by relative movements between the piston and cylinder to admit compressed fluid to the space above the piston, an auxiliary chamber, a passage leading from the cylinder to said auxiliary chamber and so disposed as to establish communication between the space above the piston and the auxiliary chamber after predetermined movement of the piston, a discharge orifice located in the cylinder wall at a point below said passage, and a grooved valve stem associated with said valve to admit fluid to the space above the piston in relatively large quantities up to the time that said passage is uncovered by the piston and in relatively small quantities up to the time that said discharge orifice is uncovered by the piston.

In testimony whereof I affix my signature, in presence of two witnesses.

HENRI MERCIER.

Witnesses:
 CHAS. P. PRESSLY,
 PERE DUPERE.